(12) United States Patent
Savage (10) Patent No.: US 7,444,929 B1
(45) Date of Patent: Nov. 4, 2008

(54) SHELLER

(75) Inventor: Basil W. Savage, Madill, OK (US)

(73) Assignee: Savage Equipment Incorporated, Madill, OK (US)

( * ) Notice: Subject to any disclaimer, the term of this patent is extended or adjusted under 35 U.S.C. 154(b) by 617 days.

(21) Appl. No.: 11/025,742

(22) Filed: Dec. 29, 2004

(51) Int. Cl.
*A23N 5/00* (2006.01)
*A47J 43/00* (2006.01)

(52) U.S. Cl. .............................. 99/569; 99/574; 99/579

(58) Field of Classification Search .................. 99/574, 99/579, 585, 593, 617, 618, 519
See application file for complete search history.

(56) References Cited

U.S. PATENT DOCUMENTS

| 493,887 | A | | 3/1893 | Gamble | |
|---|---|---|---|---|---|
| 505,002 | A | | 9/1893 | Read | |
| 1,926,705 | A | * | 9/1933 | Urschel | ........................ 99/630 |
| 2,669,268 | A | * | 2/1954 | Meyer | ........................ 99/569 |
| 2,796,987 | A | * | 6/1957 | Meyer | ........................ 209/628 |
| 4,052,992 | A | | 10/1977 | Taylor | |
| 4,144,805 | A | | 3/1979 | Cacho | |
| 5,296,248 | A | | 3/1994 | Huang | |
| 5,511,469 | A | * | 4/1996 | Satake et al. | ................... 99/519 |
| 5,879,734 | A | | 3/1999 | Broyles | |
| 6,135,020 | A | | 10/2000 | Broyles | |
| 6,951,169 | B2 | * | 10/2005 | Ohno | ........................... 99/519 |

* cited by examiner

*Primary Examiner*—Reginald L Alexander
(74) *Attorney, Agent, or Firm*—McAfee & Taft (57) ABSTRACT

The current invention provides an improved sheller for removing the husk or shell from nuts, legumes and other similar plant products. The sheller of the current invention includes an improved ring assembly. The improved ring assembly comprises ring units having an inner ring and an outer ring. Each inner ring carries integrally formed spacers and each outer ring carries integrally formed spacers. Each inner ring directly contacts an adjunct inner ring and each outer ring directly contacts an adjacent outer ring. Through use of integrally formed spacers, the current invention significantly reduces the number of component requiring assembly during the manufacture of the sheller.

9 Claims, 12 Drawing Sheets

SHELLER

The current invention relates to an improved sheller for removing shell or husk fragments from the meat of a tree nut, a legume or other similar plant products. The improved sheller is particularly useful for removing shell fragments from pecans and walnuts. For the sake of clarity, the following disclosure will focus primarily on the shelling of pecans.

As is known to those skilled in the art, preparation of clean, readily edible pecans requires many steps. Following harvest, pecans are normally sized and cracked. Although the cracking process frees approximately 25-50% of the pecans completely from their shells, the remaining pecans still carry an undesirable woody portion of the shell. To provide the desired product, further processing is normally carried out in a sheller.

A typical sheller houses a rotating assembly comprising a beater bar and a ring assembly. Pecans enter the sheller, passing to the interior of the ring assembly and encounter the beater bar. The rotating action of the ring assembly and the beater bar strip the remaining woody material from the pecans. The clean pecan meat subsequently exits the sheller for further processing.

Figure 1:
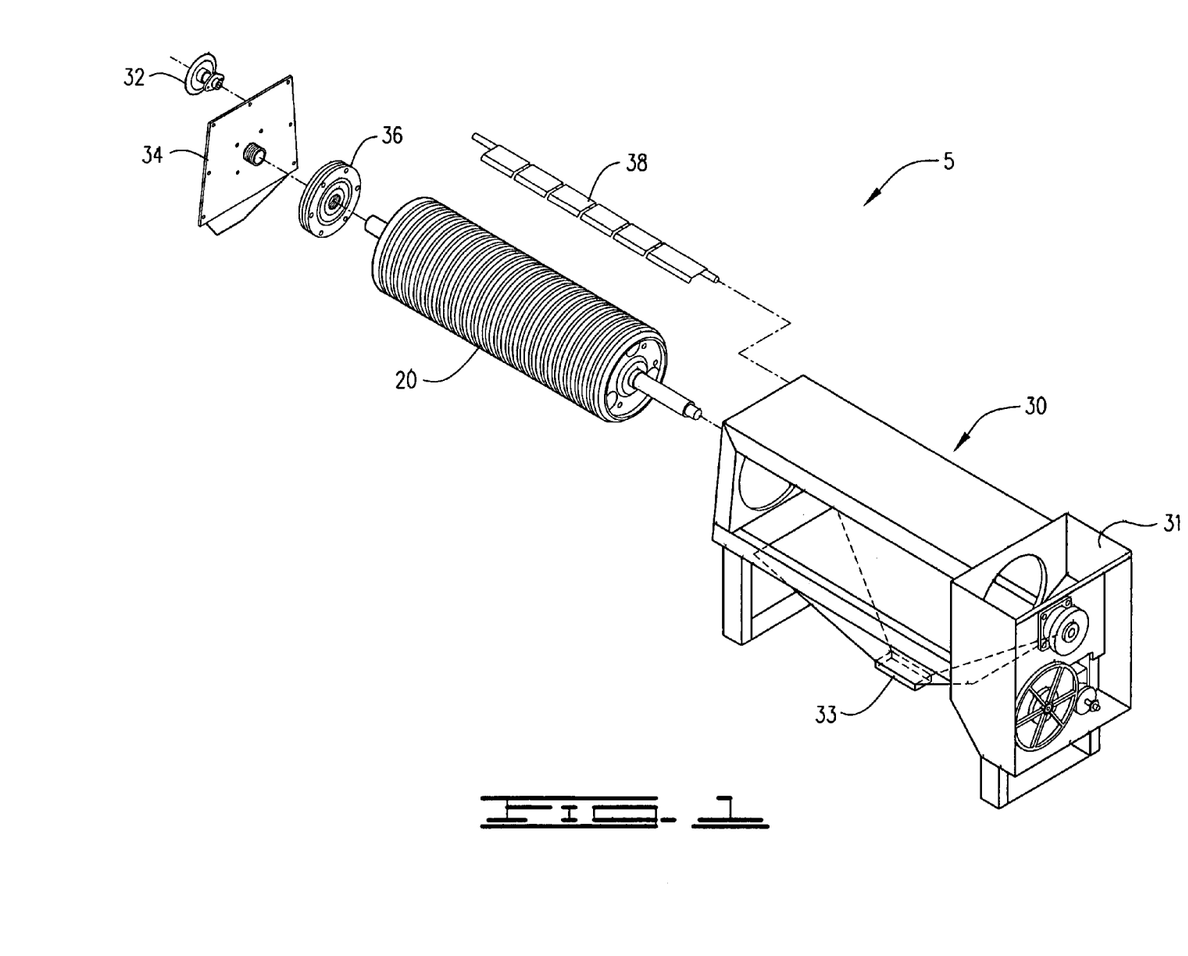
FIG. 1 is a perspective view of a sheller unit.
Figure 2:
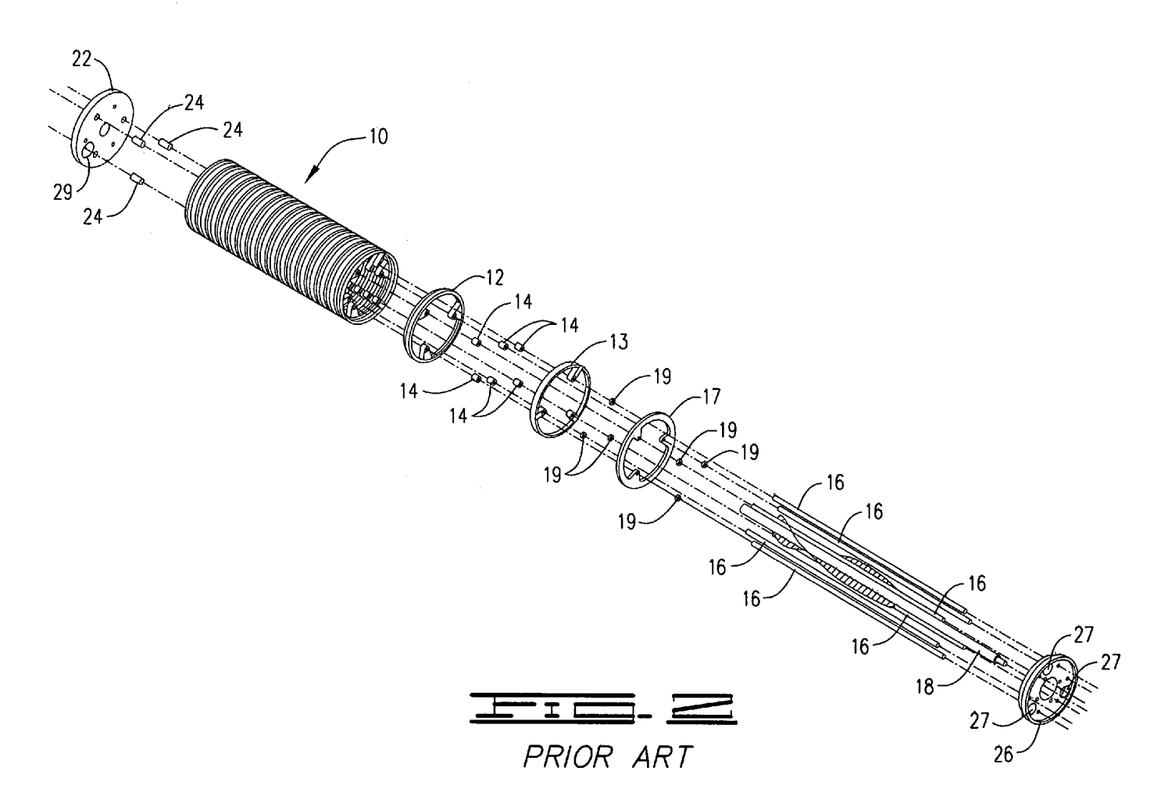
FIG. 2 is an expanded view of a prior art ring assembly.

While available shellers provide a quality product, current designs are difficult to assemble and maintain due to the number of components in the ring assembly. FIG. 1 depicts a typical sheller unit 5 and FIG. 2 depicts a prior art ring assembly 10 currently used in sheller 5. As shown in FIG. 2, ring assembly 10 comprises a number of inner rings 12 and outer rings 13 carried by rods 16 and separated by spacers 14. Manufacture of ring assembly 10 is a time intensive process requiring positioning of three spacers 14 on rods 16 prior to adding every inner ring 12 and outer ring 13. Additionally, maintenance of ring assembly 10 requires careful removal and storage of each inner ring 12, outer ring 13 and spacer 14. Frequently, spacers 14 are lost during disassembly of sheller 5. Clearly, improvements in the design of ring assembly 10 would be welcomed by those skilled in the art.

The current invention provides an improved ring assembly 20 designed to overcome the problems associated with currently available ring assembly 10. In particular, the current invention provides an improved sheller having fewer parts and requiring less time to assemble and disassemble. Ring assembly 20 of the current invention is suitable for replacing prior art ring assembly 10 used in existing shellers 5.

SUMMARY OF THE INVENTION

The current invention provides an improved ring assembly for use in an improved sheller. The improved ring assembly requires less time to assemble and disassemble. The improved ring assembly comprises a plurality of ring units wherein each ring unit has an inner and an outer ring. Each inner and outer ring carries integrally formed spacers. Thus, the current invention eliminates a significant number of components normally requiring assembly during manufacture of the sheller. The sheller also includes a ring adjustment assembly. The ring adjustment assembly provides the means for setting a gap between the inner and outer rings of the ring assembly. The sheller of the current invention also includes conventional drive mechanisms necessary to rotate the ring assembly and a beater bar.

In the improved ring assembly, each inner ring and outer ring has at least two arms. The arms preferably project inwards towards the center of the ring. The arms carry the integrally formed spacers. When assembled, adjacent inner rings directly contact each other through the integral spacers and adjacent outer rings directly contact each other through the integral spacers.

The ring assembly includes a gap between the outer ring of one ring unit and the inner ring of an adjacent ring unit. The size of the gap is determined by the ring adjustment assembly. Movement of the ring adjustment assembly moves the outer ring towards or away from the inner ring of the associated ring unit thereby changing the width of the gap between the outer ring of one ring unit and the inner ring of the adjacent ring unit.

The current invention significantly reduces the number of parts requiring assembly. By eliminating the separate spacers from the ring assembly, a sheller of the current invention, having eleven ring units with three arms per ring, utilizes 66 fewer parts compared to a prior art sheller. Current invention shellers, having nineteen ring units with three arms per ring, will use 114 fewer parts than a prior art sheller. Thus, the current invention significantly reduces the time required to manufacture the sheller. Additionally, the reduction of individual parts simplifies the disassembly and maintenance of the sheller.

BRIEF DESCRIPTION OF THE DRAWINGS

FIG. 5 is a side view of an inner ring of the current invention.
FIG. 6 is a perspective view the inner ring of the current invention.
FIG. 19 is a section view of the sheller assembly taken along section line 19-19 of FIG. 17.

DETAILED DESCRIPTION OF THE PREFERRED EMBODIMENTS OF THE INVENTION

The current invention provides improvements to sheller 5 of the type depicted in FIG. 1. In particular, the current invention replaces prior art ring assembly 10 with an improved ring assembly 20. As shown in FIG. 2, prior art ring assembly 10 includes prior art inner rings 12, prior art outer rings 13, individual spacers 14 and rods 16. Manufacture of prior art ring assembly 10, requires positioning of each inner ring 12, outer ring 13 and spacers 14 on rods 16. Since three spacers 14 are associated with each inner ring 12 and outer ring 13, manufacture of ring assembly 10 is a multi-step, time intensive job. Located to the interior of ring assembly 10 is a beater bar 18. Ring assembly 10 and beater bar 18 are positioned within the housing 30 of sheller 5. Ring assembly 10 also includes a spacer 17 and washers 19 located between outer ring 13 and sprocket 26. As will be described below, ring assembly 20 of the current invention provides improvements to sheller 5 by eliminating individual spacers 14. In particular, improved ring assembly 20 reduces manufacturing costs and simplifies maintenance of sheller 5.

The current invention will be described initially with reference to FIGS. 1, 3 and 4. Elements common to both prior art ring assembly 10 and improved ring assembly 20 will be described using like numerals. Ring assembly 20 includes a plurality of ring units 60. Each ring unit 60 comprises an inner ring 62 and an outer ring 66. In the preferred embodiment, ring assembly 20 of the current invention utilizes cast inner and outer rings 62 and 66. Inner ring 62 has a shoulder 64 on the exterior diameter thereof. Shoulder 64 is capable of sliding within the interior diameter of outer ring 66. Outer ring 66 includes a shoulder 68 on the interior diameter thereof. When assembled on rods 16, the inner rings of each ring unit 60 are in a fixed position while outer rings 66 are laterally adjustable. Lateral movement of outer rings 66 is provided by ring adjustment assembly 36.

Once positioned within housing 30, an end plate assembly 34 secures ring assembly 20 and beater bar 18 within sheller 5. End plate assembly 34 carries hand crank 32. Hand crank 32 is connected to ring adjustment assembly 36 carried by ring assembly 20. Hand crank 32 and ring adjustment assembly 36 permit adjustment of the width of gap 76.

As known to those skilled in the art, ring assembly 20 and beater bar 18 rotate within sheller 5 in order to remove the husks or hulls of nuts, such as pecans, and legumes, such as peanuts, from the meat of the nut. Rotation of the ring assembly 20 and beater bar 18 is provided by a conventional drive assembly (not shown in detail). The drive assembly generally includes a motor for driving beater bar 18 and a separate motor for rotating ring assembly 20. Known combinations of belts, chains and sprockets may be used to rotate beater bar 18 and ring assembly 20.

Figure 3:
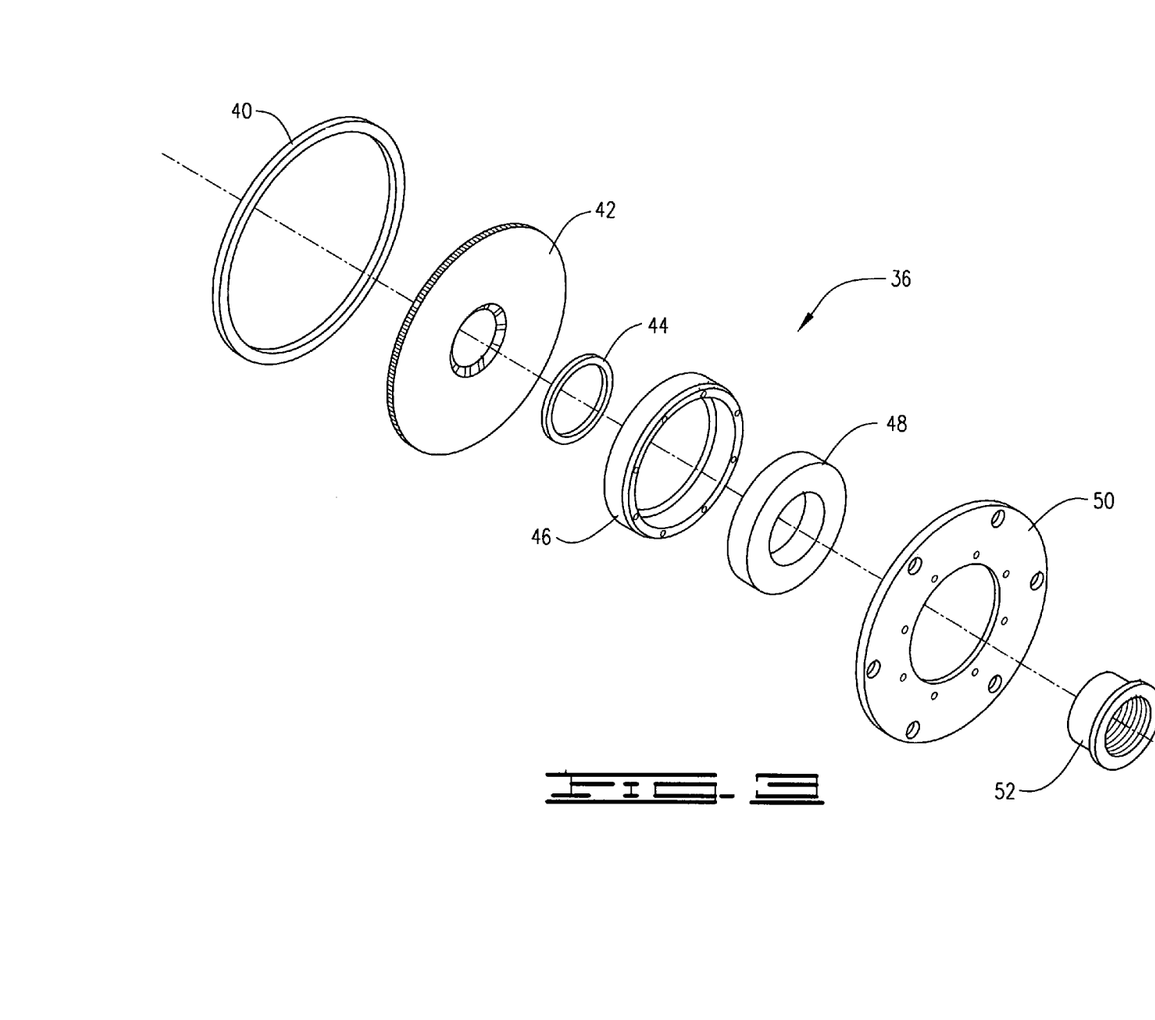
FIG. 3 is an expanded view of the ring adjustment assembly.

As shown in FIG. 3, a conventional ring adjustment assembly 36 comprises a large spur gear 40, a ring gear mount plate 42, a bearing spacer 44, a bearing mount ring 46, a bearing 48 and a ring bearing mount plate 50, followed by an axial adjustment nut 52. Movement of hand crank 32 rotates spur gear 40 and adjustment nut 52 of ring adjustment assembly 36. Ring adjustment assembly 36 engages ring exit plate 22 and rod adjustment bushings 24 which in turn engage outer ring 66 of first ring unit 61. Thus, rotation of hand crank 32 moves ring exit plate 22 and bushings 24 laterally, thereby imparting lateral movement to outer rings 66. All outer rings 66 move in unison thereby providing a uniform gap 76 for ring assembly 20.

Figure 17:
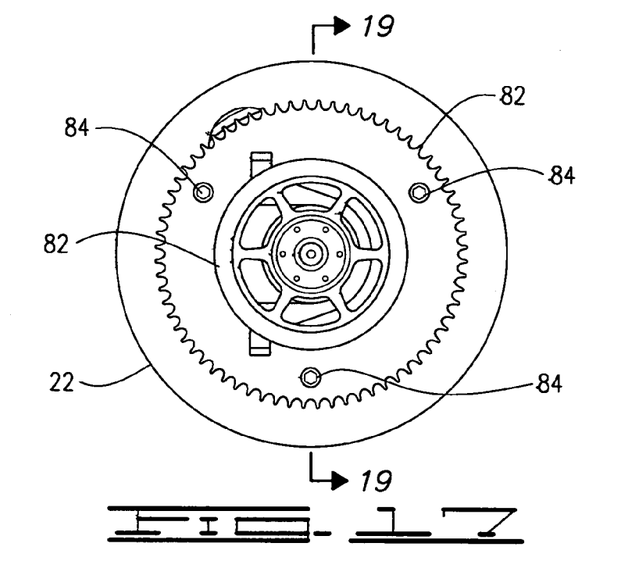
FIG. 17 is an end view of an alternate embodiment of the mechanism for adjusting the gap between the rings.
Figure 18:
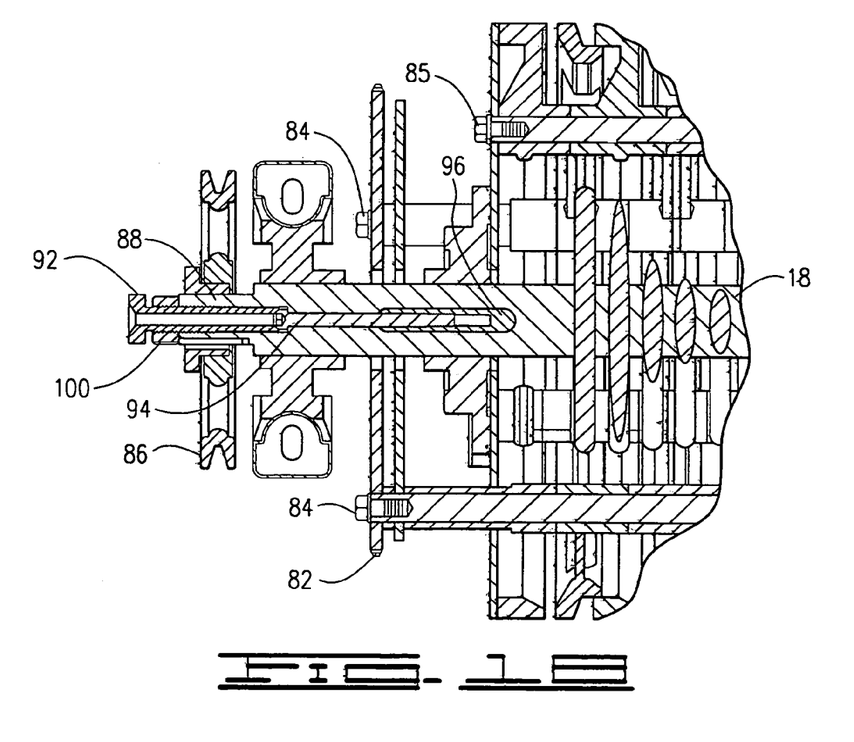
FIG. 18 is a detailed view of an alternate embodiment of the ring adjustment assembly.

Another currently available configuration of ring adjustment assembly 36 for adjusting gap 76 between ring units 60 is depicted by FIGS. 17-19. In FIGS. 17-19, the drive mechanism for ring assembly 20 and beater bar 18 also incorporates ring adjustment assembly 36. As shown in FIG. 17, this embodiment includes conventional devices such as sprocket 82 and pulley 86. Bolts 84 or other similar securing devices join sprocket 82 to rods 16 carrying outer rings 66 and bolts 85 join rods 16 carrying inner rings 62 to exit plate 22. Thus, rotation of sprocket 82 by conventional means such as a motor and chain (not shown) provides the driving force for rotation of ring assembly 20. Likewise pulley 86, carried by beater shaft 88, is driven by conventional means such as a belt and motor arrangement (not shown). Thus, rotation of pulley 86 provides rotational movement to beater shaft 88 and beater bar 18.

In this embodiment, adjustment of gap 76 is provided by movement of exit plate 22. Adjustment is provided by inserting a hex shaped rod (not shown) into adjustment bolt lock 92 until the rod engages the bearing adjustment bolt 94. Bearing adjustment bolt 94 is secured to the bearing adjustment plate 96. Bearing adjustment plate 96 engages beater shaft 88 in a manner which permits lateral movement of bearing adjustment plate 96. Additionally, bearing adjustment plate 96 is secured to flange bearing 98. Flange bearing 98 engages outer rings 66 through exit plate 22.

Thus, rotation of bearing adjustment bolt 94 by the hex shaped rod moves flange bearing 98, exit plate 22 and outer rings 66 laterally. Following adjustment of gap 76, the hex rod is removed from adjustment bolt lock 92 and a jam nut 100 secured against adjustment bolt lock 92 to preclude further lateral movement of rings 66.

Figure 12:
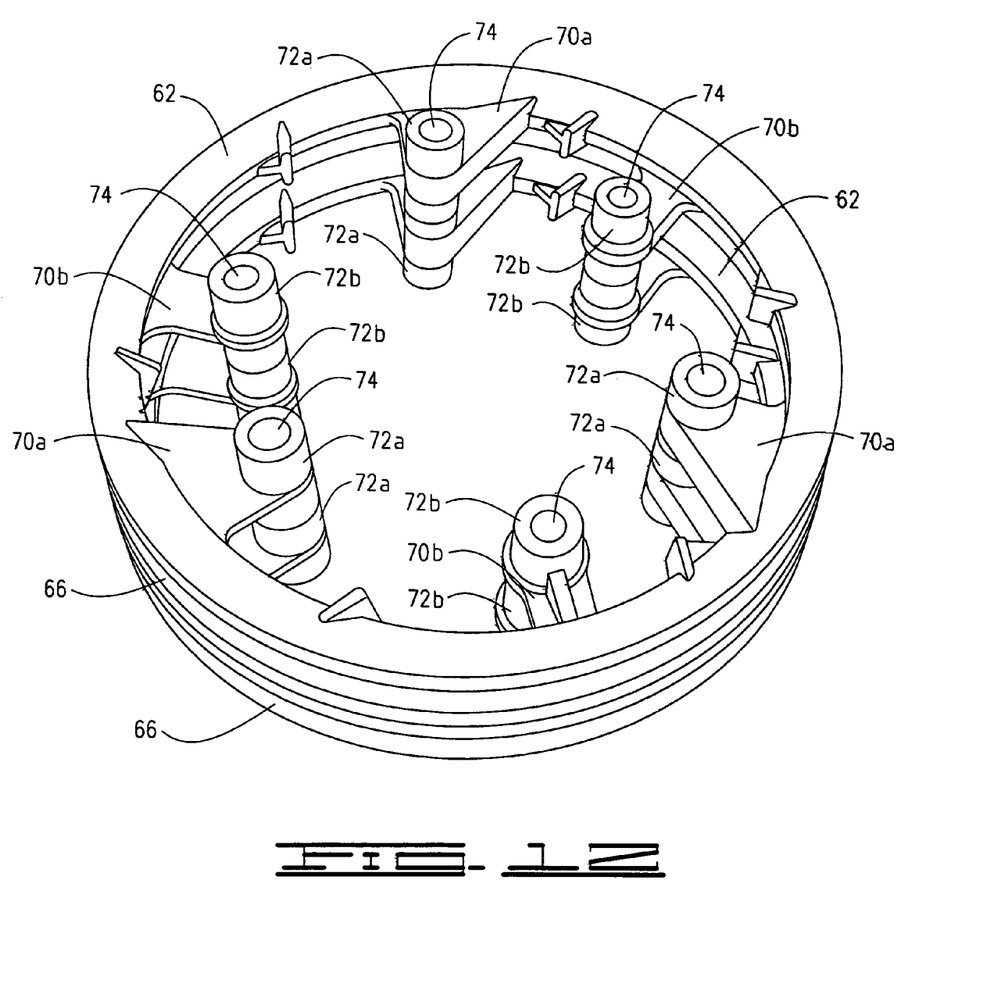
FIG. 12 is a perspective view of two ring units.

When processing pecans, gap 76 is set by adjusting outer rings 66 laterally until gap 76 is substantially equal to the size of the average pecan being shelled. As depicted in FIG. 12, gap 76 is found between an outer ring 66 of one ring unit 60 and an inner ring 62 of an adjacent ring unit 60.

With reference now in particular to FIGS. 5-12, the preferred embodiment of inner ring 62 and outer ring 66 will be described. As shown in the Figs., the preferred embodiment of each inner ring 62 and outer ring 66 has at least three inwardly projecting arms 70. Arms 70a are found on inner ring 62 and arms 70b are found on outer ring 66. In the preferred embodiment, the terminal end of each arm has an integrally formed spacer 72. Spacer 72a is found on inner ring 62 and spacer 72b on outer ring 66. Each spacer 72 has a hole 74. Holes 74 permits mounting each inner ring 62 and outer ring 66 on rods 16. As shown in FIG. 12, spacers 72a carried by one inner ring 62 directly contact spacers 72a of an adjacent inner ring 62. Similarly, spacers 72b of one outer ring 66 directly contact spacers 72b of an adjacent outer ring 66. Finally, ring assembly 20 also includes a spacer 17 and washers 19 located between outer ring 66 and sprocket 26 and carried by rods 16. Preferably, inner and outer rings 62 and 66 are formed by casting. Thus, rings 62 and 66 and spacers 72a, 72b are formed integrally in one step.

For the purposes of this disclosure, integrally formed spacer 72 projects outwardly from arm 70. In an alternative embodiment, spacers 72a and 72b may be manufactured separately from inner rings 62 and outer rings 66 and subsequently secured to arms 70a and 70b. Thus, arms 70a and 70b carry spacers 72a and 72b in a manner which does not require separate assembly on rods 16. For example, individual spacers 72a and 72b may be welded, press fitted, threaded or otherwise attached to arms 70a and 70b respectively. Preferably, spacers 72a and 72b are permanently attached to arms 70a and 70b.

Figure 11:
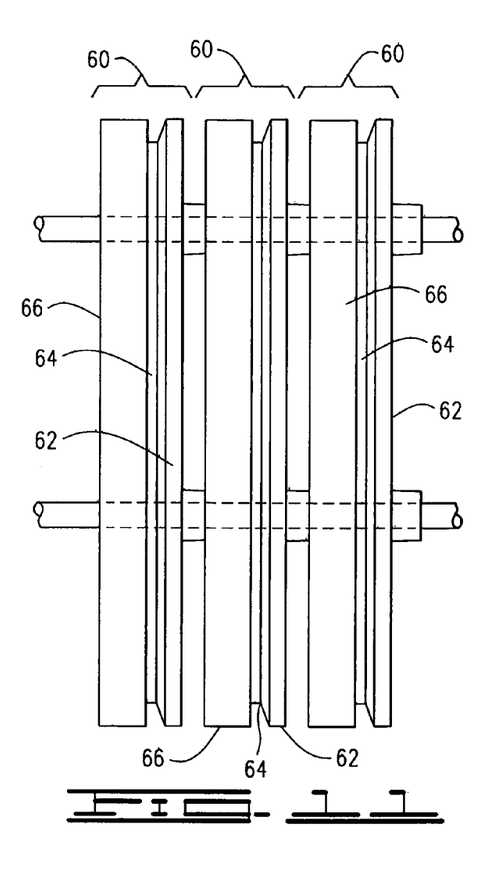
FIG. 11 depicts an assembly of three ring units.

With reference to FIGS. 11 and 12, inner ring 62 and outer ring 66 of each ring unit 60 do not normally contact each other unless ring assembly 20 has been adjusted to provide the widest possible gap 76. When adjusted in this manner, the shoulder 64 found on the exterior diameter of inner ring 62 contacts the shoulder 68 found on the interior diameter of outer ring 66. As noted above, lateral movement of outer ring 66 is provided by ring adjustment assembly 36. In the preferred embodiment, there is clearance between the outside diameter of inner ring shoulder 64 and the inside diameter of outer ring 66 of about 0.015 to about 0.030 of an inch.

Figure 13:
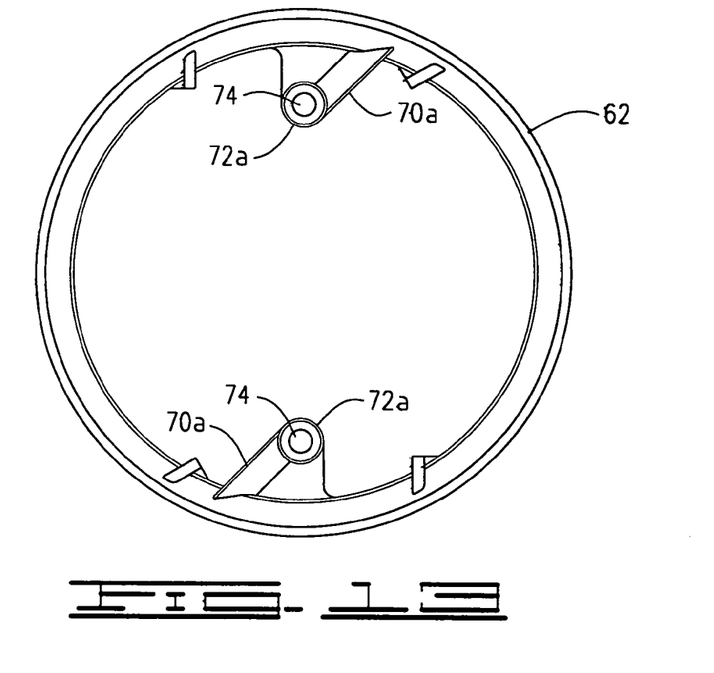
FIG. 13 is an alternate embodiment of an inner ring.
Figure 14:
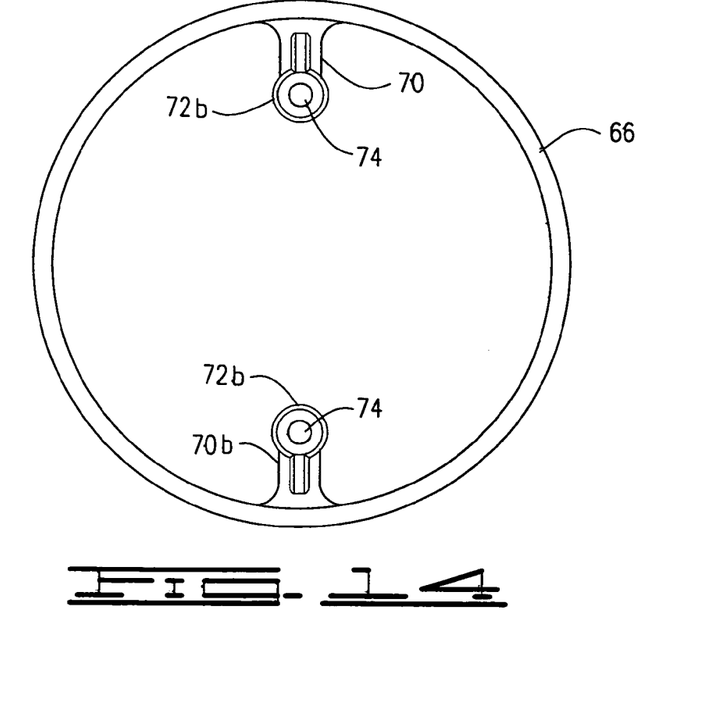
FIG. 14 is an alternate embodiment of an outer ring.

In the preferred embodiment, inner rings 62 and outer rings 66 are castings with three inwardly projecting arms 70, which carry integrally formed spacers 72. However, other embodiments of rings 62 and 66 are also contemplated. For example, FIGS. 13 and 14 depict inner ring 62 and outer ring 66 as having only two inwardly projecting arms 70. As in the above-described preferred embodiment, each arm 70 carries integrally formed spacers 72a and 72b.

Figure 15:
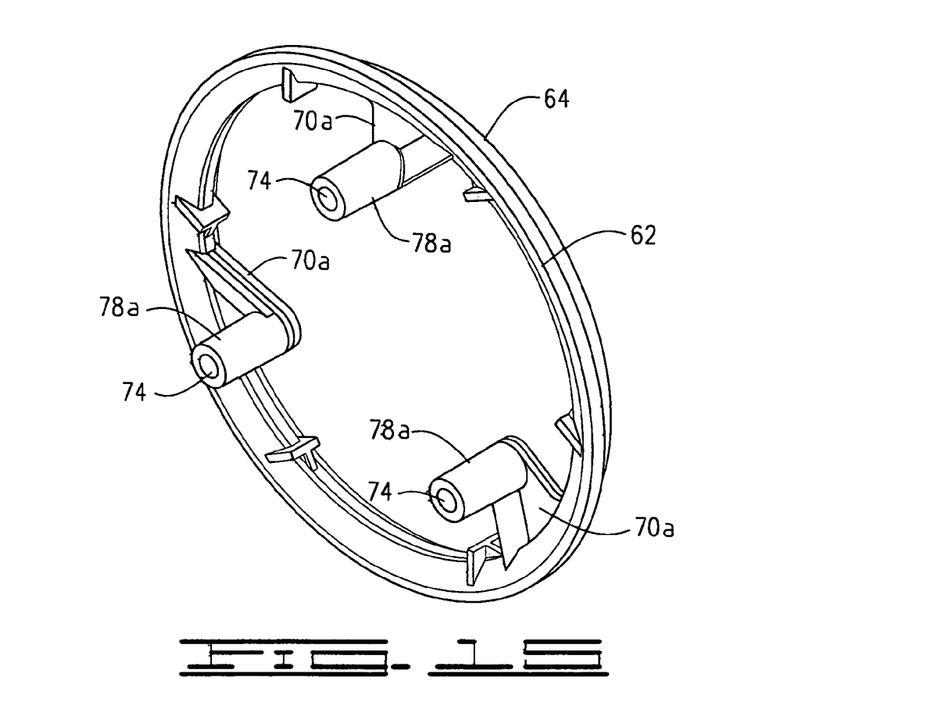
FIG. 15 is another alternate embodiment of an inner ring.
Figure 16:
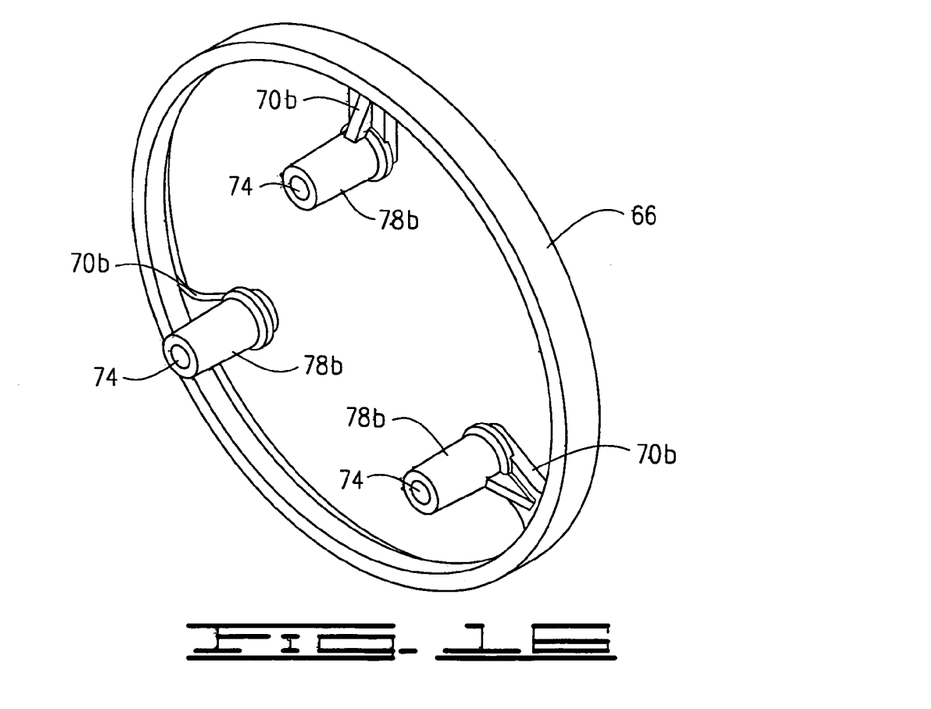
FIG. 16 is another alternate embodiment of an outer ring.

The current invention also contemplates an arm 70 carrying a spacer 78 on only one side of arm 70. As depicted in FIGS. 15 and 16, spacers 78 are typically longer than spacers 72. Thus, adjacent inner rings 62 directly contact one another through spacers 78a and adjacent outer rings 66 directly contact one another through spacers 78b.

Figure 4:
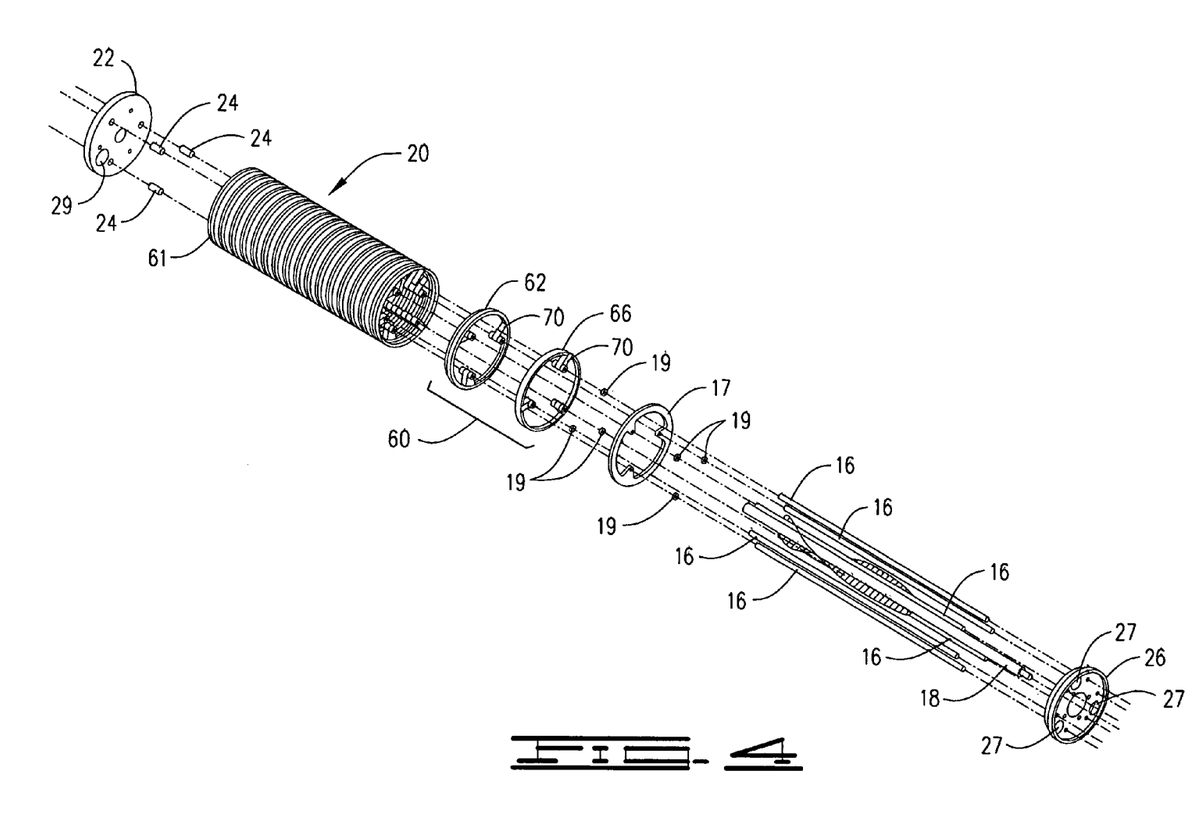
FIG. 4 is an expanded view of a preferred ring assembly of the current invention.
Figure 7:
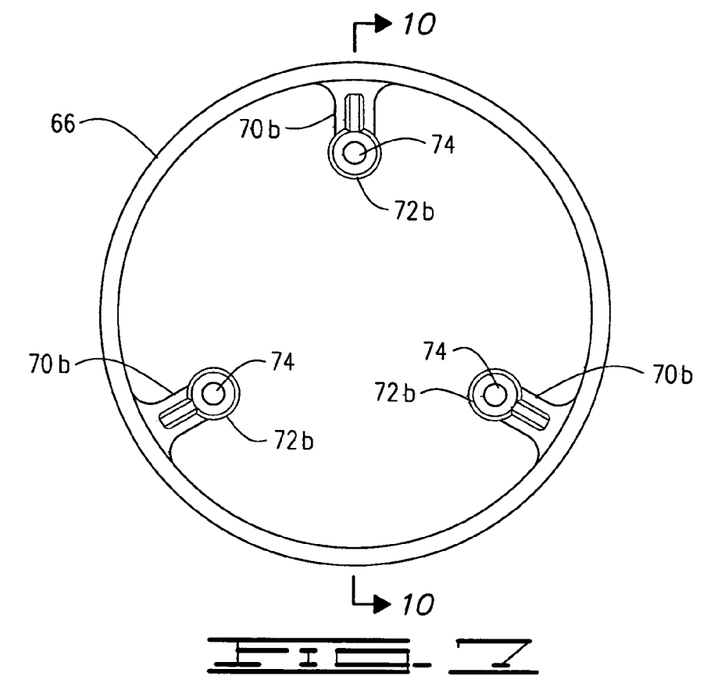
FIG. 7 is a side view of an outer ring of the current invention.
Figure 8:
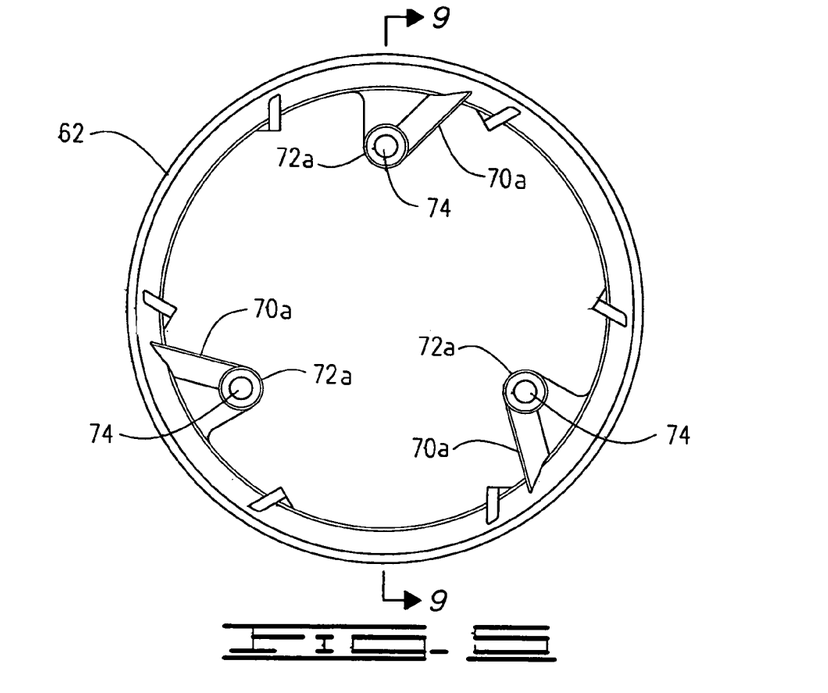
FIG. 8 is a perspective view of the outer ring of the current invention.
Figure 9:
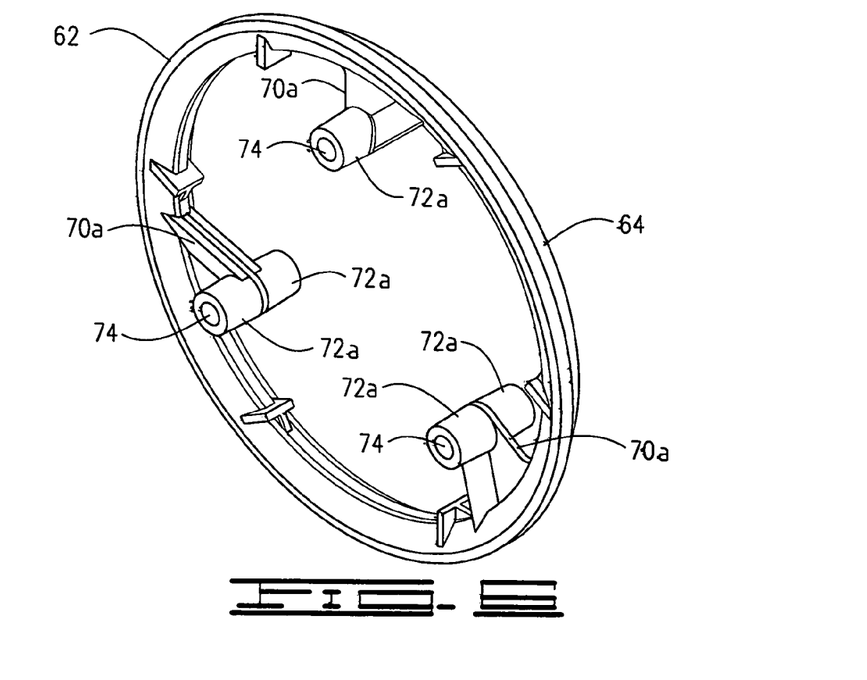
FIG. 9 is a sectional view of the inner ring of the current invention taken along line 9-9 of FIG. 5.
Figure 10:
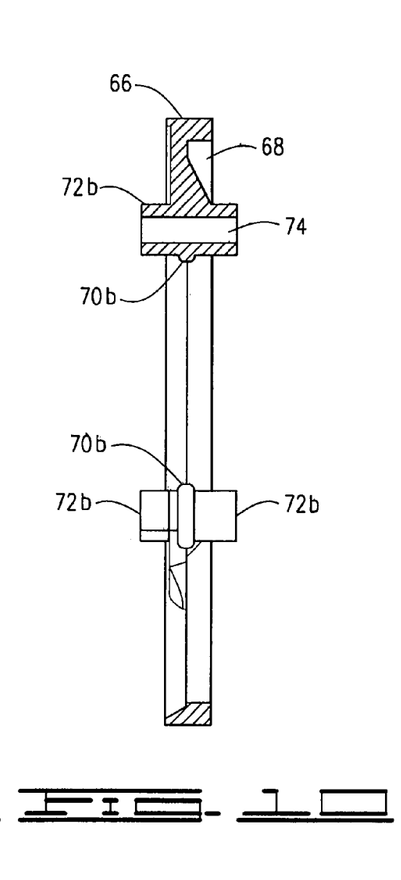
FIG. 10 is a sectional view of the outer ring of the current invention taken along line 10-10 of FIG. 7.

As shown by a comparison of FIGS. 2 and 4, ring assembly 20 of the current invention utilizes significantly fewer parts than ring assembly 10 of the prior art. As previously noted, for each inner ring 62 and outer ring 66 utilized in ring assembly 20, three fewer parts are required during the assembly process. Thus, ring assembly 20 of the current invention reduces assembly time and manufacturing expenses associated with sheller 5. Further, ring assembly 20 reduces maintenance costs by reducing time to disassemble and reassemble sheller 5.

Operation of sheller 5 comprising improved ring assembly 20 is identical to operation of sheller 5 with prior art ring assembly 10. In general, pecans or other similar food product are initially sized and gap 76 is adjusted to an optimum setting corresponding to the average size of the nut to be shelled. Gap 76 is set by rotation of hand crank 32. Thereafter, cracked pecans enter sheller 5 through hopper 31 and pass into rotating ring assembly 20 through feed ports 27 located within sprocket 26. Once inside ring assembly 20, the pecans encounter rotating beater bar 18. Ring assembly 20 tumbles the pecans as beater bar 18 provides sufficient force to remove substantially all remaining shell material. A scraper 38 contacts the upper surface of ring assembly 20 to remove any pecans lodged in gap 76. The pecans, now substantially free of shell or husk, pass through gap 76 and exit sheller 5 through the bottom 33 of sheller 5. Any pecans larger than gap 76 exit ring assembly 20 through port 29 located within ring exit plate 22.

While the present invention has been described in detail with reference to FIGS. 1-19, other embodiments will be apparent to those skilled in the art. Thus, the foregoing specification is considered exemplary with the true scope and spirit of the invention being indicated by the following claims.

I claim:

1. A sheller for separating shell or husk fragments from the meat of a tree nut or legume comprising:
    a housing; and,
    a rotatable ring assembly positioned within said housing, the ring assembly comprising a plurality of ring units, wherein each ring unit has an inner ring and a laterally adjustable outer ring, the inner ring of one ring unit directly contacts the inner ring of an adjacent ring unit and the outer ring of one ring unit directly contacts the outer ring of an adjacent ring unit, wherein each inner ring and each outer ring carries at least one integral spacer, and wherein the ring units define a an adjustable gap through which the meat passes;
    a ring adjustment assembly for setting a gap between adjacent ring units; and,
    a beater bar positioned to the interior of said ring units, wherein said beater bar carries said ring adjustment assembly.

2. The sheller of claim 1, wherein each ring has at least two arms and wherein each arm has at least one integrally formed spacer.

3. The sheller of claim 1, wherein each ring has at least three inwardly projecting arms and wherein each arm has at least one integrally formed spacer.

4. The sheller of claim 1, wherein each ring has at least two arms and wherein each arm carries an integral spacer said spacer integrated thereto by welding, threads or press fitting.

5. The sheller of claim 1, wherein said rings are castings and wherein each ring has at least three arms and each arm has at least one integrally formed spacer.

6. The sheller of claim 3, wherein said spacers are carried on each side of said arms.

7. The sheller of claim 3, wherein said spacers are carried on only one side of said arms.

8. A sheller for separating shell or husk fragments from the meat of a tree nut or legume comprising:
    a housing;
    a rotatable ring assembly positioned within said housing, the ring assembly comprising a plurality of ring units, each ring unit having an inner ring and a outer ring, wherein at least one ring of each ring unit is laterally adjustable, each inner ring and each outer ring has at least two inwardly projecting arms, each arm having at least one integral spacer thereon, wherein each inner ring of one ring unit contacts an adjacent inner ring of an adjacent ring unit through at least one spacer and wherein each outer ring of one ring unit contacts an adjacent outer ring of an adjacent ring unit through at least one spacer; and,
    a ring adjustment assembly for setting a gap between the inner ring of one ring unit and the outer ring of an adjacent ring unit; and,
    a beater bar positioned to the interior of said ring units, wherein said beater bar carries said ring adjustment assembly.

9. A sheller for separating shell or husk fragments from the meat of a tree nut or legume comprising:
    a housing;
    a rotatable ring assembly positioned within said housing, the ring assembly comprising a plurality of ring units, each ring unit having an inner ring and an outer ring, wherein at least one ring of each ring unit is laterally adjustable, each inner ring and each outer ring has at least three inwardly projecting arms, each arm having at least one integral spacer thereon, wherein each inner ring of one ring unit contacts an adjacent inner ring of an adjacent ring unit through at least one spacer and wherein each outer ring of one ring unit contacts an adjacent outer ring of an adjacent ring unit through at least one spacer; and,
    a ring adjustment assembly for setting a gap between the inner ring of one ring unit and the outer ring of an adjacent ring unit;
    a beater bar positioned to the interior of said ring units; and,
    a drive mechanism for rotating said beater bar and said ring assembly, wherein said drive mechanism incorporates said ring adjustment assembly.

* * * * *